June 5, 1928. V. G. LEACH Re. 16,984

BURNER AND METHOD OF BURNING FUEL

Original Filed March 21, 1924 3 Sheets-Sheet 1

Inventor
Vernon Garde Leach
by Charles Hills
Attys

June 5, 1928. V. G. LEACH Re. 16,984

BURNER AND METHOD OF BURNING FUEL

Original Filed March 21, 1924 3 Sheets-Sheet 2

INVENTOR

Dermon Garde Leach

Charles Hills

By Attys

June 5, 1928. V. G. LEACH Re. 16,984

BURNER AND METHOD OF BURNING FUEL

Original Filed March 21, 1924 3 Sheets-Sheet 3

Inventor
Vernon Garde Leach.
Charles Hills
Attys

By

Reissued June 5, 1928. Re. 16,984

UNITED STATES PATENT OFFICE.

VERNON G. LEACH, OF CHICAGO, ILLINOIS.

BURNER AND METHOD OF BURNING FUEL.

Original No. 1,552,438, dated September 8, 1925, Serial No. 700,786, filed March 21, 1924. Application for reissue filed April 13, 1928. Serial No. 269,791.

This invention relates to a burner and method of burning fuel more particularly designed for pulverized fuel.

In the large majority of burners designed for the use of finely divided fuel, the fuel is introduced into the furnace suspended in a current of air, both air and fuel having essentially the same velocity. Upon being introduced into the furnace, the fuel gives off its volatile content almost instantly, and this volatile content readily burns. The small particles of devolatilized fuel, however, soon surround themselves with an atmosphere of carbon monoxide or carbon dioxide which has to be scrubbed off before further combustion can proceed. This scrubbing action is best brought about by the creation of a relative velocity between the fuel particle and the surrounding atmosphere of gases. Either the fuel particles should travel faster than the gases, or the gases should travel faster than the fuel particles. If there is such relative movement of the particles and gas, the film of partially-consumed gases which surrounds each fuel particle will be constantly scrubbed off and combustion will be completed in a short length of flame travel.

Finely divided fuel, being highly explosive when thoroughly mixed and suspended in the proper amount of air, should be introduced into the furnace at a muzzle velocity that creates an ample margin of safety between the velocity of the entering fuel and the velocity of rate of flame propagation, in order that the fire shall not creep back into the feeder line and create an explosion. It is exceedingly difficult to give this desired muzzle velocity without driving the fuel a great distance through the furnace and creating a very long flame which, of course, will necessitate very large furnaces.

The principal object of the present invention is to provide means and method for obtaining short flame combustion and this is attained first by a high muzzle velocity and second by instantly spreading the entering air and fuel out over a wide area so that their forward velocity is very greatly reduced, thus securing all the benefits of a low velocity burner with the safety margin of the high velocity burner.

Now I have found that these advantageous results can be obtained by the use of a burner having two passages therein adapted to project streams of fuel and air obliquely inwards against each other to produce a fan-shaped flame in a plane perpendicular to the plane in which such passages lie.

The scrubbing action, above referred to, is brought about by the rapid slowing up of the air introduced through the burner by the mutual impingement of the jets which result in the spreading of the combustible mixture in a fan-shaped spray. The fuel particles have stored in them a certain amount of kinetic energy which causes them to shoot forward at a higher velocity than the air or gases in which they have been supported.

Other and further important objects of this invention will be apparent from the disclosures in the specification and drawings.

The invention (in a preferred form) is illustrated in the drawings and hereinafter more fully described.

Figure 1:
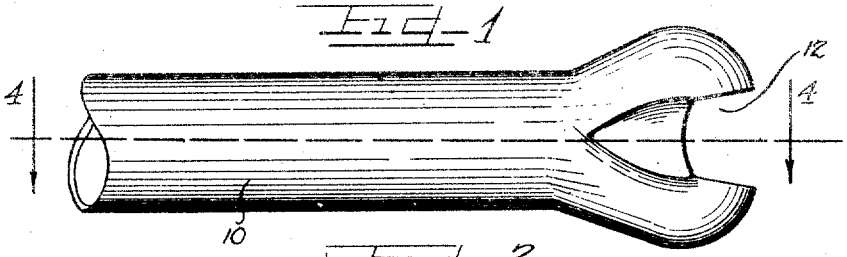
Figure 1 is a side elevation of a burner constructed in accordance with the present invention.
Figure 2:
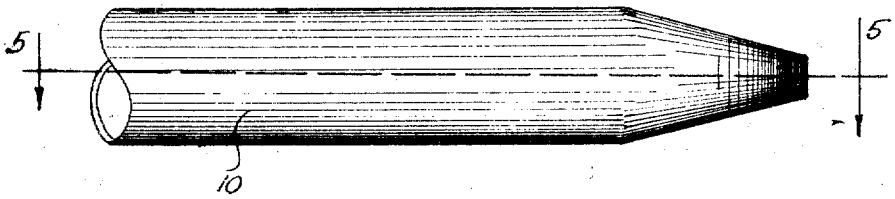
Figure 2 is a plan view of the same.

The burner is constructed with two passages therein adapted to project streams of air carrying powdered fuel against each other to produce a fan-shaped flame in a plane perpendicular to the plane in which said passages lie. Various forms of construction may be employed. In the particular form illustrated by way of example the burner 10 is formed from a metal tube flattened at the end and depressed inwardly at its center portions as at 11, and provided with an exit orifice 12. By flattening the tube and curving the ends inwardly two passages are formed on either side of the flattened portions 11 adapted to project streams of air and powdered fuel obliquely against each other. These impinging streams create a fan-shaped flame perpendicular to the plane in which such passages lie.

The impinging streams are projec ed towards each other at such an angle that the velocity components of the two streams in opposition to each other is greater than the velocity components in the direction of the resulting flame. In the preferred form of construction shown in the drawings this angle is about 140°.

Further, as shown, the distance the streams are projected before they mutually impinge is only a small fraction of the length of the resulting flame.

With impingement occurring close to the burner and at a wide angle there is a tendency for a part of the resulting flame to strike back towards the burner. As shown the flattened portions 11 of the burner do not contact and the stream of air and fuel passing between such portions carries forward such part of the flame as would otherwise strike back.

Figure 6:
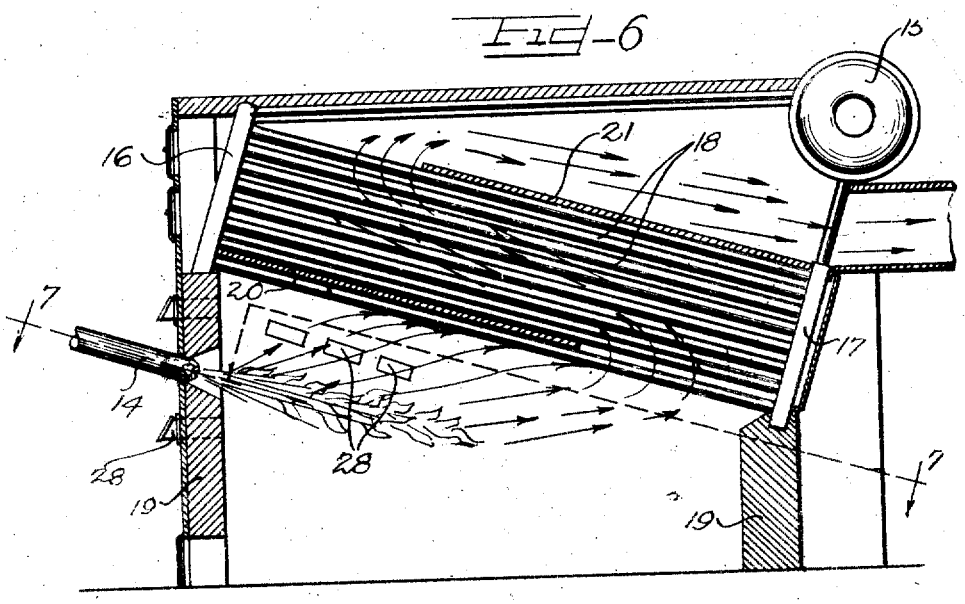
Figure 6 is a vertical section through a water tube type boiler fitted with one of the improved burners.
Figure 7:
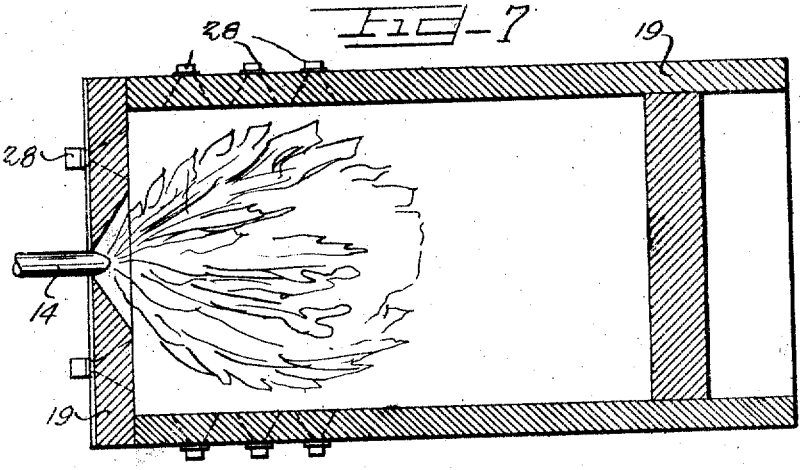
Figure 7 is a section on the line VII—VII of Figure 6.

Various installations of burners are shown in Figures 6 to 11 inclusive. In Figures 6 and 7 a burner 14 is shown in connection with a horizontally-baffled water-tube boiler comprising steam drum 15, header 16, downcomer 17, tubes 18, brickwork setting 19 and baffles 20 and 21.

The burner 14 is inserted through an aperture in the front wall of the boiler setting so as to direct a laterally extended sheet of flame beneath the boiler.

Figure 8:
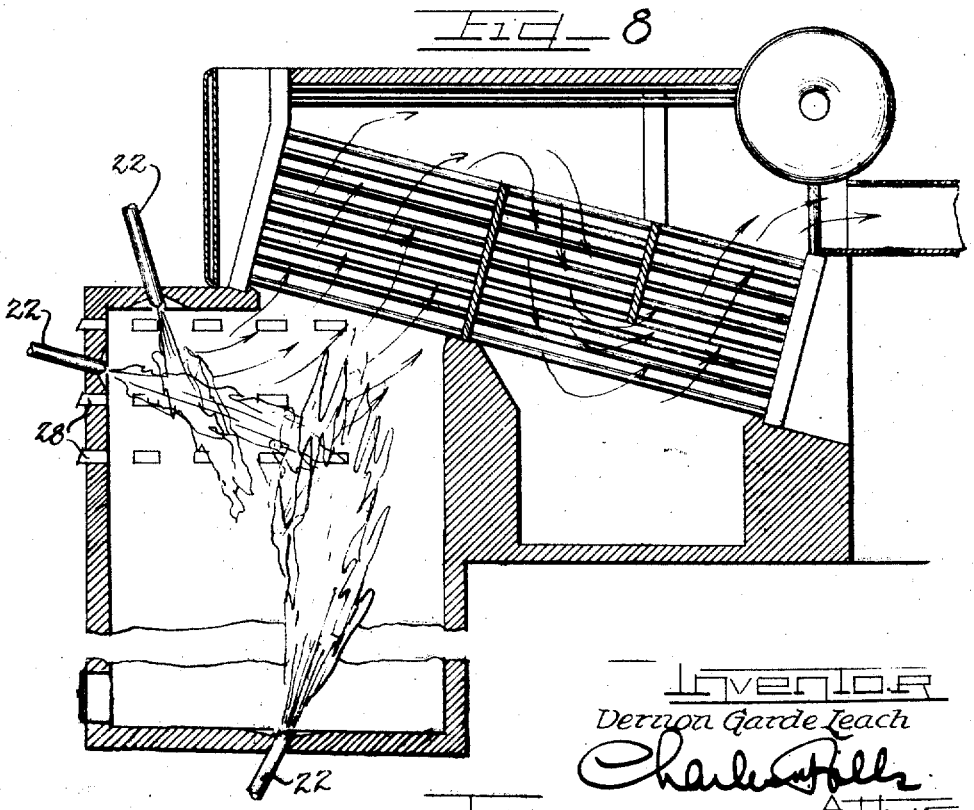
Figure 8 is a vertical section through another form of water tube boiler showing three alternative positions of the burner.

In Figure 8 is shown three alternative applications of a burner 22 in connection with a vertically baffled water-tube boiler.

Figure 9:
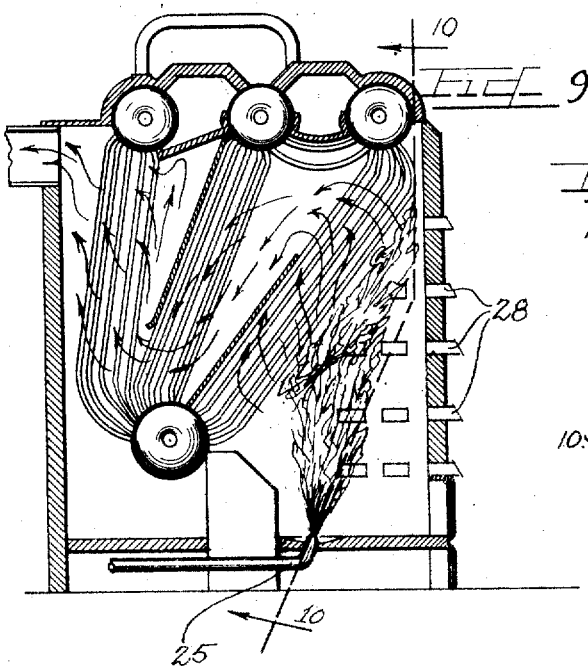
Figure 9 is a vertical section through a Stirling boiler fitted with the improved burners.
Figure 3:
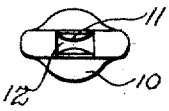
Figure 3 is an end view of the same.
Figure 4:
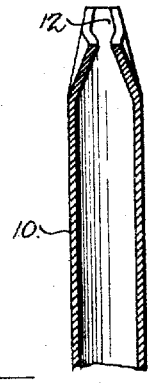
Figure 4 is a section on the line IV—IV of Figure 1.
Figure 5:
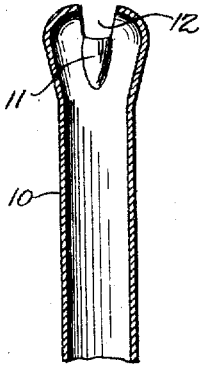
Figure 5 is a section on the line V—V of Figure 2.
Figure 10:
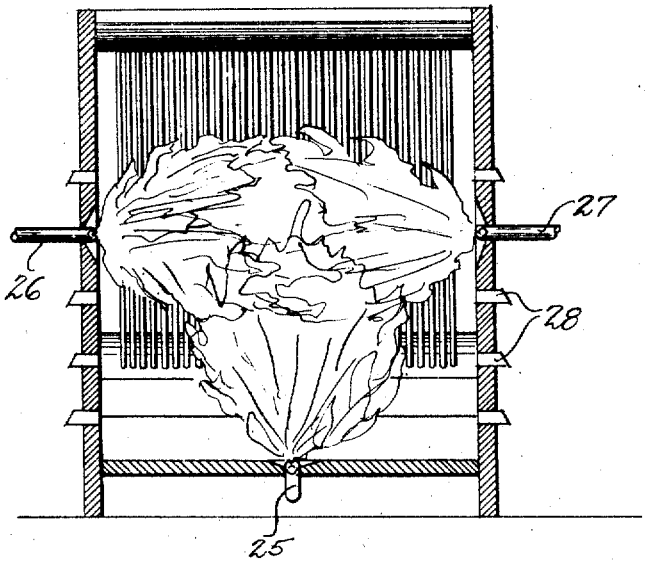
Figure 10 is a section on the line X—X of Figure 9.

An arrangement in which one, two or three burners may be employed simultaneously is shown in Figures 9 and 10 where burners 25, 26 and 27 are employed for heating a Stirling or vertical water-tube type boiler. One of these burners 25 is arranged in the bottom of the combustion chamber while the other two, 26 and 27, are located at opposite points in the side walls of the combustion chamber.

Figure 11:
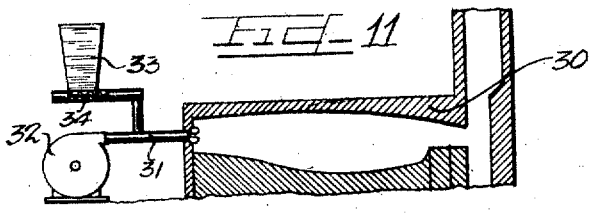
Figure 11 is a section through a reverbatory furnace fired by a burner constructed in accordance with the present invention.

In Figure 11 a metal furnace 30 is shown fitted with a burner 31 of the construction above described. Air is fed to the burner by means of a fan 32 and simultaneously powdered fuel is supplied to the burner from a bin 33 by the feeder 34.

While a portion or all of the air required for combustion is introduced with the fuel from a suitable blower, additional air may, if desired, be introduced into the combustion chamber as for example through apertures 28 as shown in Figures 6 to 10.

It is desirable that the fuel shall be intimately and uniformly mixed and distributed throughout the current of air issuing from the burner. In the conveying and distribution of finely divided fuel suspended in air, the tendency is for the particles of fuel to separate out and travel along in strata or streaks, creating an uneven or spotted combustion condition in the furnace. The construction of this burner is such that the finely divided fuel is very intimately remixed or blended with the air in which it is suspended at the very point of introduction into the furnace. This mixing or blending action, coupled with the slow flame velocity and accompanied by the maximum difference in velocities between the fuel particles and their surrounding atmosphere causes the flame to be unusually short and the combustion efficiency to be very high. To these advantages may be added the margin of safety created by a high muzzle velocity which is ordinarily much higher than the rate of flame propagation.

I am aware that many changes may be made and numerous details of construction may be varied through a wide range without departing from the principles of this invention, and I therefore do not purpose limiting the patent granted otherwise than necessitated by the prior art.

I claim as my invention:

1. An apparatus for burning powdered fuel comprising a source of powdered fuel, a source of air under sufficient pressure to project the powdered fuel mixed therewith through a burner at a speed greater than the speed of flame propagation through the mixture, said burner having two passages therein adapted to project streams of air carrying powdered fuel obliquely inwards against each other to produce a fan-shaped flame in a plane perpendicular to the plane in which said passages lie.

2. A method of burning powdered fuel comprising projecting two streams of air carrying powdered fuel against each other at a speed greater than the speed of flame propagation whereby ignition does not occur until the velocity of the streams is reduced by the mutual impingement.

3. A method of burning powdered fuel comprising projecting two streams of air carrying powdered fuel against each other at an angle of about 140° and at a speed greater than the speed of flame propagation whereby ignition does not occur until the velocity of the streams is reduced by the mutual impingement.

4. A method of burning powdered fuel comprising projecting two streams of air carrying powdered fuel against each other at a speed greater than the speed of flame propagation whereby ignition does not occur until the velocity of the streams is reduced by the mutual impingement and projecting a third stream of air carrying powdered fuel in the same direction as the flame produced by the union of the first mentioned streams and between the latter.

5. A method of burning powdered fuel comprising projecting two streams of air carrying powdered fuel against each other at an angle of about 140° and at a speed greater than the speed of flame propagation whereby ignition does not occur until the velocity of the streams is reduced by the mutual impingement and projecting a third stream of air carrying powdered fuel in the same direction as the flame produced by the union of the first mentioned streams and between the latter.

6. A method of burning powdered fuel comprising projecting two streams of air carrying powdered fuel against each other at a speed greater than the speed of flame propagation whereby ignition does not occur until the velocity of the streams is reduced by the mutual impingement, the angle between the two streams being such that the velocity components of the two streams in opposition to each other is greater than the velocity components in the direction of the resulting flames.

7. A method of burning powdered fuel comprising projecting two streams of air carrying powdered fuel against each other at a speed greater than the speed of flame propagation whereby ignition does not occur until the velocity of the streams is reduced by mutual impingement, the distance the streams are projected before they mutually impinge being a small fraction of the length of the resulting flame.

8. An apparatus for burning powdered fuel comprising a source of powdered fuel, a source of air under sufficient pressure to project the powdered fuel mixed therewith through the burner at a speed greater than the speed of flame propagation through the mixture, said burner having two passages therein adapted to project streams of air carrying powdered fuel obliquely inwards against each other at an angle of about 140° to produce a fan-shaped flame in a plane perpendicular to the plane in which said passages lie.

9. An apparatus for burning powdered fuel comprising a source of powdered fuel, a source of air under sufficient pressure to project the powdered fuel mixed therewith through a burner at a speed greater than the speed of flame propagation through the mixture, said burner having two passages therein adapted to project streams of air carrying powdered fuel obliquely inwards against each other to produce a fan-shaped flame in a plane perpendicular to the plane in which said passages lie and a third passage for projecting a stream of air carrying powdered fuel between the discharge ends of the first two passages and in the same direction as the flame produced by union of the first mentioned streams.

10. An apparatus for burning powdered fuel comprising a source of powdered fuel, a source of air under sufficient pressure to project the powdered fuel mixed therewith through a burner at a speed greater than the speed of flame propagation through the mixture, said burner having two passages therein adapted to project streams of air carrying powdered fuel obliquely inwards against each other at an angle such that the velocity components of the two streams in opposition to each other is greater than the velocity components in the direction of the resulting fan-shaped flame.

11. An apparatus for burning powdered fuel comprising a source of powdered fuel, a source of air under sufficient pressure to project the powdered fuel mixed therewith through a burner at a speed greater than the speed of flame propagation through the mixture, said burner having two passages therein adapted to project streams of air carrying powdered fuel obliquely inwards against each other to produce a fan-shaped flame in a plane perpendicular to the plane in which said passages lie, the distance between the discharge ends of the first two passages to the point of impingement of the two streams being only a small fraction of the length of the resulting flame.

VERNON G. LEACH.